US011374457B2

(12) United States Patent
De Clercq et al.

(10) Patent No.: US 11,374,457 B2
(45) Date of Patent: Jun. 28, 2022

(54) ELECTRICAL PHASE CONNECTOR FOR A STATOR OF A ROTARY ELECTRIC MACHINE

(71) Applicant: Valeo Equipements Electriques Moteur, Creteil (FR)

(72) Inventors: Stéphane De Clercq, Étaples-sur-Mer (FR); Vincent Ramet, Étaples-sur-Mer (FR); Julien Pauwels, Étaples-sur-Mer (FR)

(73) Assignee: Valeo Equipements Electriques Moteur, Creteil (FR)

( * ) Notice: Subject to any disclaimer, the term of this patent is extended or adjusted under 35 U.S.C. 154(b) by 95 days.

(21) Appl. No.: 16/761,405

(22) PCT Filed: Nov. 28, 2018

(86) PCT No.: PCT/EP2018/082784
§ 371 (c)(1),
(2) Date: May 4, 2020

(87) PCT Pub. No.: WO2019/105975
PCT Pub. Date: Jun. 6, 2019

(65) Prior Publication Data
US 2021/0376682 A1  Dec. 2, 2021

(30) Foreign Application Priority Data

Nov. 29, 2017 (FR) ........................................ 1761331

(51) Int. Cl.
*H02K 3/50* (2006.01)
*H02K 3/52* (2006.01)
(Continued)

(52) U.S. Cl.
CPC ................. *H02K 3/50* (2013.01); *H02K 3/52* (2013.01); *H02K 3/522* (2013.01); *H02K 5/22* (2013.01);
(Continued)

(58) Field of Classification Search
CPC ...... H02K 3/50; H02K 2203/09; H02K 5/225; H02K 5/22; H02K 3/46; H02K 3/505;
(Continued)

(56) References Cited

U.S. PATENT DOCUMENTS

2009/0127948 A1   5/2009   Shimizu et al.
2011/0018376 A1   1/2011   Kataoka et al.
(Continued)

FOREIGN PATENT DOCUMENTS

EP    2061133 A2   5/2009
EP    2081279 A1   7/2009
(Continued)

OTHER PUBLICATIONS

Notification of Reason for Rejection issued in corresponding Japanese Application No. 2020-529332, dated Jul. 6, 2021 (9 pages).
(Continued)

*Primary Examiner* — Quyen P Leung
*Assistant Examiner* — Alexander A Singh
(74) *Attorney, Agent, or Firm* — Osha Bergman Watanabe & Burton LLP

(57) ABSTRACT

The invention relates to a rotary electric machine for a vehicle comprising an electronic assembly, a stator and an electrical phase connector (10) for a rotary electric machine stator (20). The electrical phase connector (10) comprises a predefined angular configuration of electrical coupling means (130b) so as to carry, respectively, a different electrical phase toward or away from a rotary electric machine
(Continued)

stator (20). Each electrical coupling means (130*b*) is electrically connected to a conductive phase track (110).

11 Claims, 5 Drawing Sheets

(51) Int. Cl.
*H02K 5/22* (2006.01)
*B60R 16/03* (2006.01)
*F02N 11/04* (2006.01)

(52) U.S. Cl.
CPC .............. *H02K 5/225* (2013.01); *B60R 16/03* (2013.01); *F02N 11/04* (2013.01); *H02K 2203/09* (2013.01)

(58) Field of Classification Search
CPC .......... H02K 3/52; H02K 3/521; H02K 3/522; H02K 3/524; H02K 3/525; H02K 3/00; H02K 11/048; H02K 11/30; H02K 11/33; H02K 3/28; H02K 3/12; B60R 16/03; F02N 11/04
USPC .......................................................... 310/71
See application file for complete search history.

(56) References Cited

U.S. PATENT DOCUMENTS

| 2016/0268860 A1 | 9/2016 | Tsuiki et al. |
| 2017/0005535 A1* | 1/2017 | Gervais .................. H02K 3/522 |
| 2017/0085145 A1* | 3/2017 | El Baraka .............. H02K 3/522 |
| 2017/0093239 A1* | 3/2017 | Teranishi ................. H02K 3/18 |
| 2017/0163118 A1 | 6/2017 | Kimpara |

FOREIGN PATENT DOCUMENTS

| JP | 2009-124902 A | 6/2009 |
| WO | 2009/113633 A1 | 9/2009 |
| WO | 2015/079732 A1 | 6/2015 |
| WO | 2017/118786 A1 | 7/2017 |
| WO | 2017/195481 A1 | 11/2017 |

OTHER PUBLICATIONS

International Search Report and Written Opinion corresponding to International Application No. PCT/EP2018/082784, dated Apr. 1, 2019 (14 pages).

* cited by examiner

ELECTRICAL PHASE CONNECTOR FOR A STATOR OF A ROTARY ELECTRIC MACHINE

TECHNICAL FIELD

The present invention relates to the standardisation of the stators of electrical machines, and particularly their electrical control. In particular, the invention concerns particularly an electrical phase connector for a stator of a rotary electrical machine, as well as a stator comprising an electrical phase connector of this type.

PRIOR ART

A rotary electrical machine is a, preferably polyphase, electromechanical device making it possible to convert electrical energy into mechanical energy, or conversely. A known application of rotary electrical machines in the field of motor vehicles is the alternator, i.e. a device which makes it possible to use the mechanical energy of the thermal engine in order to recharge the battery of the vehicle. Another known application of rotary electrical machines in the field of motor vehicles is the alternator-starter, i.e. a device for stopping and automatic restarting of a thermal engine of a motor vehicle which makes it possible to reduce the fuel consumption and pollution, for example during a stoppage with a short duration at a red light.

Thus, the rotary electrical machine can be used as a generator or as a motor in order to produce mechanical energy from electrical energy, and to rotate the thermal engine.

In a known manner, the rotary electrical machine comprises a rotor which is fitted such as to rotate in the interior of a stator comprising a cylindrical stator body and a winding with a plurality of electrical phases, each of the electrical phases being formed by a plurality of electrical conductors wound axially around the stator body. The winding is connected electrically to an electronic assembly, and particularly to a power module, at a free end of some of the electrical conductors forming the phase inputs/outputs of the winding.

According to the type of rotary electrical machine, the form and/or the technical characteristics of the stator may vary. By way of non-limiting example, according to the number of electrical phases of the rotary electrical machine and its use, the number, the geometry and the angular orientation of the phase inputs/outputs making it possible to connect the stator to the electronic assembly can vary from one rotary electrical machine to another.

This great variability of rotary electrical machines has led to the design and production of a large number of stators which are all different, because of the need to provide an electrical connection interface which is suitable for each of the configurations and/or uses. Consequently, the production costs have increased.

An objective of the present invention is to propose a new electrical phase connector for a stator of a rotary electrical machine, in order to resolve the aforementioned problems at least to a large extent, and also to result in other advantages.

In particular, an objective of the present invention is to make it possible to standardise the production of the stator bodies and their windings.

Another objective of the present invention is to simplify the methods for production of the stators of a given family of rotary electrical machines, by facilitating the creation of varied electrical couplings.

SUMMARY OF THE INVENTION

According to a first aspect of the invention, at least one of the aforementioned objectives is achieved with a rotary electrical machine for a vehicle, the said machine comprising an electronic assembly making it possible to control the said machine, a stator comprising a stator body with a plurality of notches formed between its two axial ends, and a winding fitted in the stator body via the said notches, the winding comprising a plurality of portions of conductor forming phase inputs/outputs, and an electrical phase connector designed to interface the winding electrically with the electronic assembly; the connector comprising a plurality of conductive phase tracks which are insulated electrically against one another, each conductive track being connected firstly to an element of the electronic assembly and secondly to a phase input/output, in order to transport an electrical phase from or to the stator.

Thus, the electrical phase connector according to the first aspect of the invention makes it possible to interface an electrical machine stator with the electrical circuit of the electronic assembly with which it cooperates. The electrical connector makes it possible to connect each of the electrical phases of the electrical machine to the electrical circuit which controls its operation. Thus, when the electrical machine is used as a motor, in order to convert electrical energy into mechanical energy, then the electrical phase connector makes it possible to supply power to the electrical phases of the stator in order to generate a rotary magnetic field which rotates the rotor. In addition, when the electrical machine is used as an alternator, in order to convert mechanical energy into electrical energy, then the electrical phase connector makes it possible to recuperate electric currents which are generated at the stator and are induced by the rotation of the rotor.

Thus, the electrical phase connector according to the first aspect of the invention makes it possible to standardise the design and production of the stator with a standard electrical connector and according to an implantation on the stator which is common to all the models: only the geometry and/or the configuration of the electrical phase connector according to the first aspect of the invention is adapted according to the electrical circuit with which it cooperates and/or according to the integration of the said stator into its environment, for example in a motor vehicle.

This advantageous configuration also makes it possible to reduce the production costs and to simplify the production of a connector of this type for an electrical phase and/or an electrical machine.

The connection between the electrical winding and the phase connector is preferably formed via electrical coupling means which are integral with the conductive phase tracks, in order to transfer an electrical power signal to or from the stator, and more particularly to one of the electrical phases of the stator, in order to control the electrical machine or to recuperate the power signals induced by the rotation of the rotor of the electrical machine, as previously described, "Integral" preferably means that the electrical coupling means are connected mechanically to the corresponding conductive tracks, and preferably that they are also coupled electrically to the said corresponding tracks. It will be appreciated that, within the context of the interfacing of a polyphase electrical machine, each conductive track and each corresponding electrical coupling means is insulated against the other conductive tracks, in order to be able to transfer different electrical potentials.

The electrical phase connector according to the first aspect of the invention is also configured to be able to be connected electrically to the electrical circuit of the electronic assembly via a second side, such that the conductive tracks are connected respectively electrically to a power circuit of the electronic assembly. Specific means for electrical connection of the electrical phase connector to the power circuit will be described in greater detail hereinafter in certain variant embodiments of the invention.

The electrical phase connector according to the first aspect of the invention can comprise at least one of the following improvements, with the technical characteristics forming these improvements being able to be taken alone or in combination:

Each conductive track extends according to a circular contour around a central axis. According to one embodiment, the circular contour according to which each conductive track extends is of the type of an angular segment of a circle, the said circular contour being open;

At least part of the conductive phase tracks comprises an electrical connection part. Preferably, each conductive electrical phase track according to the first aspect of the invention comprises an electrical connection part. This configuration makes it possible to facilitate the interfacing of the electrical phase connector and/or of the stator of the electrical machine with the electrical circuit;

Advantageously, and according to a first variant embodiment, the at least one electrical connection part is a connection terminal which is in the form of a female connector in order to facilitate the screwing and/or the welding and/or the crimping of an element of the electronic assembly on the electrical phase connector. According to a second variant embodiment, the at least one electrical connection terminal is in the form of a male connector;

According to a first embodiment which is compatible with any of the variant embodiments of the electrical connection parts, the at least one electrical connection part extends projecting relative to the body of the conductive track, and in a substantially axial direction;

in order to facilitate the interfacing of the electrical machine with the electrical circuit, each at least one electrical connection part is situated along a peripheral contour which is exterior relative to the central axis;

Each conductive track is in the form of an angular segment, This configuration makes it possible in particular to facilitate the electrical insulation between each conductive track. Each angular segment extends around the central axis. Preferably, all the conductive tracks extend at the same radial distance relative to the central axis;

Each conductive phase track comprises: a conductive track body in the form of an angular segment, at a first end of the said angular segment, an electrical connection part extending in a substantially axial direction for the connection with the electronic assembly, and, at a second end of the said angular segment, electrical coupling means which cooperate with complementary coupling means of the winding. This configuration makes it possible to facilitate the electrical interfacing, firstly with the stator with which the electrical phase connector is designed to cooperate—by means of electrical coupling means—and, secondly with the electrical circuit by means of the electrical connection terminals;

The electrical coupling means are configured to render the said electrical phase connector integral with the stator by engagement of complementary forms, for example by snapping in or by fitting together or by welding. According to a first variant, the electrical coupling means are of the female type. According to a second, alternative variant, the first electrical coupling means are of the male type;

The electrical coupling means comprise at least one curved lug, the curved lug extending facing the complementary coupling means of the winding, such as to form an electrical contact with the latter. For example, the electrical coupling means are of the type of a vice formed by a first curved lug and a second curved lug situated facing the first curved lug, the two curved lugs being spaced from one another such that the complementary coupling means of the winding is inserted between the said lugs. In other words, each curved lug is curved axially on a side opposite the face of the electrical phase connector facing the stator. Alternatively, the electrical coupling means comprise a single curved lug extending facing the complementary coupling means of the winding, such as to form an electrical contact with the latter;

The conductive tracks are over-moulded by an over-moulding material. The over-moulding material is preferably an electrically insulating material, such as, for example, plastic;

At least one of the conductive tracks additionally comprises a coupling portion with a supplementary electrical coupling means cooperating with a complementary coupling means of the winding, in order to connect a first phase of the winding electrically to a second phase. This makes it possible to create an electrical coupling between the phases by means of a phase connector, in particular a coupling of the triangle type;

According to a first alternative, the coupling portion can extend. according to an arc of a circle extending the conductive track body. According to another alternative, the coupling portion can extend according to an arc of a circle extending in parallel with the said body. In other words, the coupling portion extends over a portion of circumference which has a diameter larger or smaller than the portion of circumference around which the track body extends.

According to a second aspect of the invention, the winding additionally comprises a plurality of portions of conductor forming neutral points. According to this second aspect, the connector comprises at least one conductive neutral track, the conductive neutral track being insulated electrically against the conductive phase tracks, and connected to at least one neutral point.

In a manner similar to the conductive phase tracks, the conductive neutral track is connected to the winding via electrical coupling means which are integral with the conductive neutral track, in order to form an electrical reference potential.

The electrical reference potential which is conveyed by the conductive neutral track is for example a neutral reference signal for each of the electrical phases of the electrical machine, which is also known as the electrical ground.

The electrical phase connector according to the second aspect of the invention can comprise at least one of the following improvements, with the technical characteristics forming these improvements being able to be taken alone or in combination:

Each conductive track extends according to a circular contour around a central axis. According to one embodiment, the circular contour according to which each conductive track extends is of the type of an angular segment of a circle, the said. circular contour being open;

Each conductive track is in the form of an angular segment. Each angular segment extends around the central axis. Preferably, all the conductive tracks extend at the same radial distance relative to the central axis;

Each conductive neutral track comprises: a conductive track body in the form of an angular segment, and, at the ends of the said angular segment, electrical coupling means cooperating with complementary coupling means of the winding;

The electrical coupling means are configured to render the said electrical phase connector integral with the stator by engagement of complementary forms, for example by snapping in or by fitting together or by welding. According to a first variant, the electrical coupling means are of female type. According to a second, alternative variant, the first electrical coupling means are of the male type;

The electrical coupling means are of the type of a vice formed by a first curved lug and a second curved lug situated facing the first curved lug, the two curved lugs being spaced from one another such that the complementary coupling means of the winding is inserted between the said lugs. In other words, each curved lug is curved axially on a side opposite a face of the electrical phase connector facing the stator;

Advantageously, the curved lugs of a single first electrical coupling means are both integral with a single angular segment. Alternatively, the conductive neutral track comprises a plurality of angular segments, each angular segment comprising, at one of its ends at least, a curved lug forming a vice with the curved lug of the angular segment directly adjacent in order to form the electrical coupling means.

According to a third aspect of the invention, the winding additionally comprises a plurality of portions of conductor forming winding connection points. According to this third aspect, the connector comprises a plurality of conductive connection tracks, each conductive connection track being insulated electrically against the conductive phase tracks, and connected to at least two connection points in order to form a connection between two electrical coils of a single phase of the winding, or a connection between two parts of a single electrical coil of a single phase.

For example, the connection between two parts of a single coil forms a turning portion forming an angle of 180° electrical within a single coil. This portion makes it possible in particular to invert the direction of the electric current in the phase.

According to an example of this third aspect of the invention, each conductive connection track forms a serial connection between two connection points of the winding of a single phase.

In a manner similar to the conductive neutral tracks, the conductive connection tracks are connected to the winding via electrical coupling means which are integral with the conductive connection track.

The electrical phase connector according to the third aspect of the invention can comprise at least one of the following improvements, the technical characteristics forming these improvements being able to be taken alone or in combination:

Each conductive track extends according to a circular contour around a central axis. According to one embodiment, the circular contour according to which each conductive track extends is of the type of an angular segment of a circle, the said circular contour being open;

Each conductive track is in the form of an angular segment. Each angular segment extends around the central axis. Preferably, all the conductive tracks extend at the same radial distance relative to the central axis;

Each conductive connection track comprises: a conductive track body in the form of an angular segment and, at the ends of the said angular segment, electrical coupling means cooperating with complementary coupling means of the winding;

The electrical coupling means are configured to render the said electrical phase connector integral with the stator by engagement of complementary forms, for example by snapping in or by fitting together or by welding. According to a first variant, the electrical coupling means are of the female type. According to a second, alternative variant, the first electrical coupling means are of the male type;

The electrical coupling means are of the type of a vice formed by a first curved lug and a second curved lug situated facing the first curved lug, the two curved lugs being spaced from one another such that the complementary coupling means of the winding is inserted between the said lugs. In other words, each curved lug is curved axially on a side opposite a face of the electrical phase connector facing the stator;

Advantageously, the curved lugs of a single first electrical coupling means are both integral with a single angular segment.

According to an embodiment which is compatible with all the embodiments, the conductive neutral tracks and/or the conductive phase tracks and/or the conductive connection tracks are situated on the same radial plane. Alternatively, the said tracks are each situated on a respective radial plane. Again alternatively, the said tracks are each situated on one or a plurality of radial planes which can be identical or different. For example, the conductive phase tracks are situated on a first radial plane, and the conductive neutral tracks are situated on this same first plane, and on a second radial plane which is different from the said first plane.

According to an embodiment which is compatible with all the embodiments, the conductive tracks are situated on the same circumference. Alternatively, the said tracks are each situated on a respective circumference, i.e. radially on the exterior or in the interior of the other conductive tracks. Again alternatively, the said tracks are each situated on one or a plurality of circumferences which can be identical or different.

According to an embodiment which is compatible with all the embodiments, the conductive tracks are created from a metal. electrically conductive material, such as copper for example.

According to an embodiment which is compatible with all the embodiments, each part of the conductive track is formed by a thin metal strip which is bent in order to be formed according to the configuration required.

According to an embodiment which is compatible with all the embodiments, the winding comprises a plurality of electrical conductors, the winding forming a plurality of electrical phases which are distinct from one another, each electrical phase being formed by a plurality of electrical conductors connected in series with one another. For example, each electrical phase is formed by a plurality of electrical conductors in the form of a bar or a "U".

For example, the winding of the electrical machine stator comprises six electrical phases.

For example, the electrical machine is of the type of an alternator or an alternator-starter or a reversible machine or an electric motor.

Varied embodiments of the invention are included., incorporating, according to all of their possible combinations, the different optional characteristics described here.

DESCRIPTION OF THE FIGURES

Other characteristics and advantages of the invention will also become apparent from the description which follows on the one hand, and from a plurality of embodiments provided by way of non-limiting indication with reference to the appended schematic drawings on the other hand, in which.

It will be appreciated that the characteristics, variants and different embodiments of the invention can be associated with one another according to different combinations, provided that they are not incompatible or mutually exclusive. In particular it will be possible to conceive of variants of the invention comprising only a selection of characteristics described hereinafter, in a manner isolated from the other characteristics described, if this selection of characteristics is sufficient to provide a technical advantage or to differentiate the invention from the prior art.

In particular, all the variants and all the embodiments described can be combined with one another if nothing opposes this combination from the technical point of view.

In the figures, elements which are common to a plurality of figures retain the same reference.

DETAILED DESCRIPTION OF THE INVENTION

Figure 1:
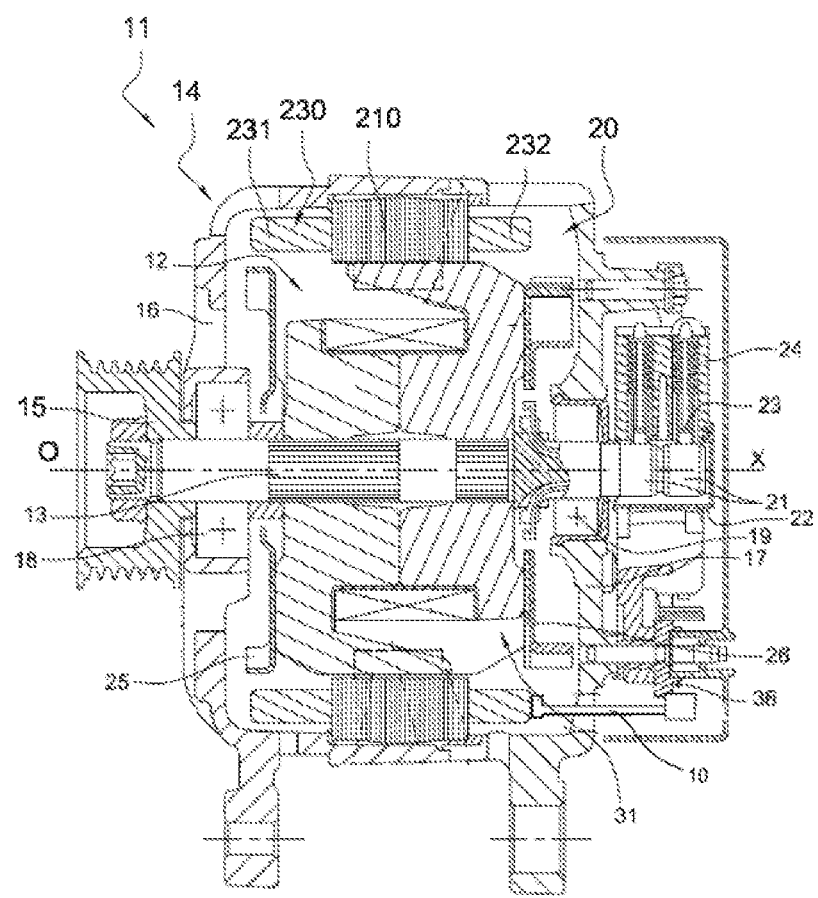
FIG. 1 illustrates a view in cross-section of a rotary electrical machine according to an embodiment of the invention.

An embodiment of a rotary electrical machine 11 is described with reference to FIG. 1. The rotary electrical machine 11 comprises a casing 14. In the interior of this casing, it also comprises a shaft 13, a rotor 12 which is integral in rotation with the shaft, and a stator 20 surrounding the rotor 12. The movement of rotation of the rotor takes place around an axis O, In this example, the casing 14 comprises a front flange 16 and a rear flange 17 which are assembled. together. These flanges 16, 17 have a hollow form, and each support centrally a bearing which is coupled to a respective ball bearing 18, 19 for fitting of the shaft 13 with rotation, A pulley 15 is secured on a front end of the shaft 13. This pulley makes it possible to transmit the movement of rotation to the shaft 13, or for the shaft 13 to transmit its movement of rotation to the belt. In addition, in this case, the rear end of the shaft 13 supports collector rings 21 belonging to a collector 22, Brushes 23 belonging to a brush-holder 24 are disposed such as to rub on the collector rings 21. The brush-holder 24 is connected to a voltage regulator (not represented). Furthermore, the flanges 16, 17 can comprise openings for the passage of air for the purpose of permitting the cooling of the machine by circulation of air generated by the rotation of a front fan 25 on the front axial face of the rotor 12, i.e. at the front flange 16, and by the rotation of a rear fan 26 on the rear axial face of the rotor, i.e. at the rear flange 17, In this example, the rotor 12 is a rotor with claws. It comprises two magnet wheels 31. Alternatively, the rotor 12 could be formed by a body, for example in the form of a set of metal plates, comprising recesses in order to accommodate permanent magnets.

Figure 2:
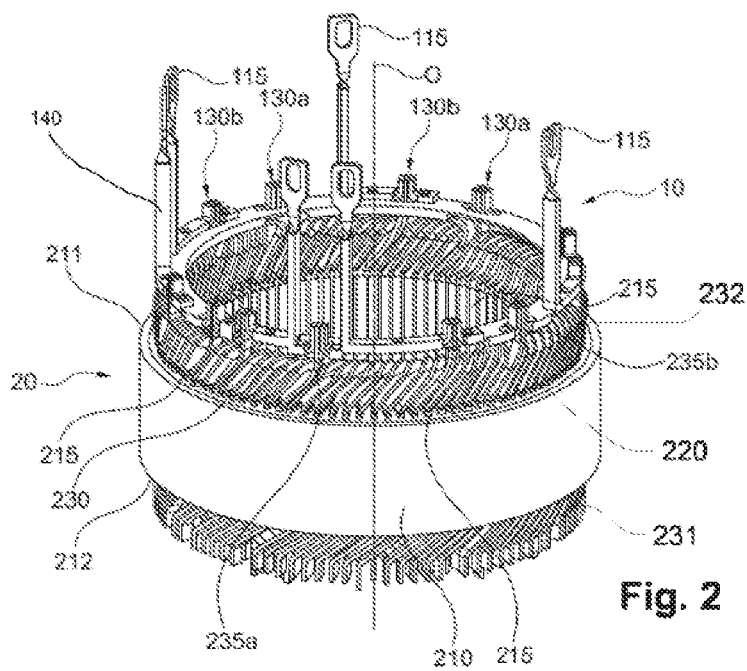
FIG. 2 illustrates a view in perspective of a first embodiment of a stator of an electrical machine according to the invention.

With reference to FIG. 2, an embodiment of a stator 20 of an electrical machine according to the second aspect of the invention is described, the said stator 20 comprising:

a stator body 210 with a cylindrical form and axial extension O, the said stator body 210 comprising a plurality of notches 215 formed between its two axial ends 211, 212;

a winding 230 comprising a plurality of electrical conductors 220 wound axially around the stator body 210, each electrical conductor 220 extending axially along a plurality of notches 215, the winding forming a plurality of electrical phases which are distinct from one another, each electrical phase being formed by a plurality of electrical conductors 220 fitted in series relative to one another in the corresponding notches 215 the assembly of electrical conductors comprising a portion extending in the notches 215 and two portions extending respectively from each axial end of the stator body 210 in order to form a front chignon 231 and a rear chignon 232.

The winding additionally comprises a plurality of first electrical connectors forming electrical phase inputs/outputs 235a, each phase input/output 235a being coupled electrically with one of the electrical conductors 220, and extending projecting relative to the chignon, preferably the rear chignon, in the axial direction O.

Again with reference to FIG. 2, a first example of an electrical phase connector 10 is described. This connector comprises electrical coupling means 130b, which are rendered integral respectively with the phase inputs/outputs 235a situated facing them. The electrical phase connector 10 will be described in greater detail with reference to FIGS. 3 to 8. When the stator 20 is connected to an electrical circuit of an electronic assembly 36 the phase inputs/outputs 235a make it possible to supply electrically the electrical conductors forming the winding of the said stator 20. In particular, each phase input/output 235a makes it possible to supply power to a different phase, This multiphase supply thus makes it possible to control better rotation of the rotor of the electrical machine, and in particular to increase the torque of the said rotor.

With reference to FIGS. 3 to 8, different embodiments of an electrical phase connector 10 will now be described.

An electrical phase connector 10 of this type comprises a plurality of conductive phase tracks 110 which are insulated electrically against one another, each conductive track 110 making it possible to convey a different electrical phase from or to the stator 20 of the electrical machine when the electrical phase connector 10 is fitted on the said stator 20. In addition, the connector comprises electrical phase coupling means 130b which are designed to cooperate with complementary coupling means 235a of the stator 20, when the electrical phase connector 10 is fitted on the said stator 20, each electrical coupling means 130b being integral with one of the conductive phase tracks. In this case, the complementary coupling means of the stator 20 are the phase inputs/outputs 235, in order to ensure electrical continuity for each of the electrical phases of the electrical machine, firstly within the electrical circuit of the electronic assembly 36, and secondly the electrical phase connector and the stator 20 of the said electrical machine.

Figure 3:
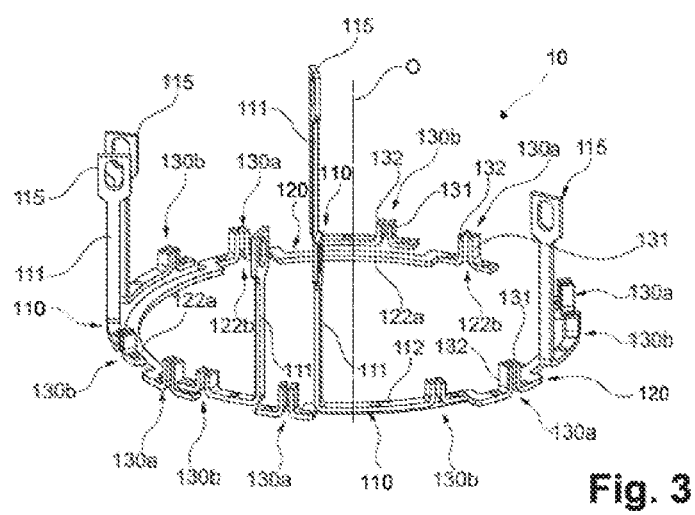
FIG. 3 illustrates a view in perspective of the phase connector in FIG. 2.

In the first embodiment illustrated in FIGS. 2 and 3, the electrical phase connector 10 comprises at least one second conductive track 120 making it possible to convey an electrical reference potential, and thus forming a conductive neutral track. In addition, the connector comprises second electrical coupling means 130a which are integral with the conductive neutral tracks 120, and make it possible to cooperate with complementary coupling means 235b of the stator 20 when the electrical phase connector 10 is fitted on the said stator 20. In this case, the complementary coupling means of the stator 20 are neutral points 235b. In a manner similar to the phase inputs/outputs 235a, the winding comprises a plurality of neutral points 235b which are insulated electrically against the phase inputs/outputs 235a. Each neutral point 235b is rendered integral—preferably mechanically and electrically—with the electrical coupling means 130a of the phase connector situated facing it.

Complementarily, the different coupling means make it possible to create a mechanical coupling of the electrical phase connector 10 on the stator 20, by rendering the said electrical phase connector 10 integral with the said stator 20 in a manner which is not definitive.

Advantageously, the conductive tracks 110, 120 are created from a metal, electrically conductive material in order to guarantee minimal resistivity. Preferably, the metal material selected is copper. The conductive tracks 110, 120 extend around the central axis O, and are delimited on the exterior periphery by a globally circular profile. The exterior peripheral contour of the electrical phase connector 10 preferably corresponds to the exterior peripheral contour of the stator 20 of the electrical machine.

The conductive neutral track 120 is formed particular by one or a plurality of angular segments forming a contour of this type around. the central axis. In the case when the first conductive track 120 is formed by a plurality of angular segments around the axis O, each segment is preferably connected electrically to the others in order to guarantee the same electrical potential for all the segments forming the said first conductive track 120. As a variant, the connector can comprise two independent phase systems. This is the case for example for a double three-phase machine, each comprising a conductive neutral track 120 as previously described. In the example illustrated in FIGS. 2 and 3, the electrical phase connector 10 comprises two conductive neutral tracks 10 each formed by four parts taking the form of angular segments.

Each part of the conductive track 120 is formed by a thin metal strip which is bent in order to be formed according to the configuration required. The thin metal strip is thus in the form of a thin strip with a very narrow thickness taken in a direction given by the central axis O on a plane perpendicular to the central axis O, the thin metal strip forming the said track 120 with a width, taken according to a direction which is radial relative to the said central axis O, which is greater than its thickness, and significantly smaller than a length of extension around the central axis. In other words, the thickness of the thin metal strip forming the conductive track is very much smaller than its width, for example by a factor of more than 5; and the width of the said thin metal strip is very much smaller than its length of extension around the axis, for example by a factor of more than 20.

The conductive track 120 extends mainly on a single plane substantially perpendicular to the central axis O. More particularly, the first conductive track 120 extends according to a globally circular contour around the central axis O. The circular contour according to which the conductive track 120 illustrated in FIGS. 2 and 3 extends is open: each conductive track 120 thus has two ends which are not connected to one another.

The conductive track 120 comprises a plurality of first electrical coupling means 130a, in order to connect the said conductive track 120 to the stator 20. In the example illustrated in FIGS. 2 and 3, each conductive track 120 comprises three electrical coupling means 130a. For example, each electrical coupling means 130a of the conductive track 120 is formed by a first segment 122b situated radially on the exterior of a second segment 122a of the said track 120. All the electrical coupling means 130a of the conductive track 120 are formed for example on first segments 122b situated at the same radial distance from the central axis O.

Again for example, all the first segments 122b of the conductive track 120 are situated radially on the exterior of the second segment 122a of the said conductive track 120.

As can be seen more particularly in FIG. 2, the first electrical coupling means 130a are configured to render the said electrical phase connector 10 integral with the stator 20 by engagement of complementary forms, for example by snapping in or by fitting together or also by welding with the neutral points 235b of the winding of the stator 20. More particularly, each first electrical coupling means 130a forms a vice. A vice of this type is formed by a first curved lug 131 and a second curved lug 132 situated facing the first curved lug 131. The two curved lugs 131, 132 are spaced. from one another in order to leave a space in which the corresponding neutral point 235b of the stator 20 can be introduced. Advantageously, each curved lug 131, 132 forming the vice of the electrical coupling means 130a is curved axially, such that an end of each curved lug 131, 132 extends axially projecting relative to the part of the conductive neutral track 120 from which it is derived. As can be seen in FIGS. 2 and 3, each first conductive track 120 comprises a plurality of angular segments, each end of which is formed by a curved lug 131, 132. Two curved lugs 131, 132 of two adjacent angular segments of the conductive track 120 form a first electrical coupling means 130a as previously described.

In a manner similar to the conductive neutral track, the conductive phase tracks 110 extend according to a globally circular contour around the central axis O. Each conductive phase track 110 is electrically insulated against the other phase tracks and the conductive neutral track 120, in order to be able to convey a different electrical phase to or from the stator 20 with which the electrical phase connector 10 is designed. to be connected. In the example illustrated in FIGS. 2 and 3, the electrical phase connector 10 comprises six conductive phase tracks 110.

Each conductive phase track 110 is formed by a thin metal strip which is bent in order to be formed according to the configuration required. The thin metal strip thus takes the form of a thin strip with a very narrow thickness taken in a direction given by the central axis O. On a plane perpendicular to the central axis O, the thin metal strip forming each conductive track 110 has a width—taken according to a direction which is radial relative to the said central axis O—which is greater than its thickness, and significantly smaller than a length of extension around the central axis O. In other words, the thickness of the thin metal strip forming each conductive track 110 is very much smaller than its width, for example by a factor of more than 5; and the width of the said thin metal strip is very much smaller than its length of extension around the central axis O, for example by a factor of more than 20.

Advantageously, the thin metal strip forming the conductive tracks 110 has a thickness and a width identical to that forming the conductive track 1120. Also preferably, the thin metal strip forming the conductive tracks 110 is made of the same material as that forming the conductive track 120.

All the conductive tracks 110 extend firstly on a single plane substantially perpendicular to the central axis O, and secondly in an axial direction O. More particularly, each conductive track 120 comprises a first part 112 which extends according to a circular segment around the central axis O, and a second part 111 which extends in an axial direction O. The second part 111 of each second conductive track 110 is situated at one of the ends at least of the corresponding first part 112.

The conductive tracks 110 each comprise a second electrical coupling means 130b in order to connect each conductive track 110 to the stator 20. The second electrical coupling means 130b of the conductive tracks 110 are for example disposed on different diameters. Alternatively, the second electrical coupling means 130b of the conductive tracks 110 can be situated at the same radial distance from the central axis O. In addition, for example, the second electrical coupling means 130b and the first electrical coupling means 130a are for example disposed on different diameters. Alternatively, the first electrical coupling means 130a and all the second electrical coupling means 130b can be situated at the same radial distance from the central axis O.

As can be seen more particularly in FIG. 2, the second electrical coupling means 130b are configured in order to render the said electrical phase connector 10 integral with the stator 20 by engagement of complementary forms, for example by snapping in or by fitting together or also by welding with the phase inputs/outputs 235a of the winding of the stator 20. More particularly, each second electrical coupling means 130b forms a vice, as previously described with reference to the first coupling means 130a, into which the corresponding phase input/output 235a of the stator 20 can be introduced. Preferably, each curved lug 131, 132 forming the vice of the second coupling means 130b is curved axially, such that an end of each curved lug 131, 132 extends projecting axially relative to the first part 112 of the conductive phase track 110 from which it is derived.

As previously described, the second part 111 of the conductive tracks 110 extends projecting axially relative to the corresponding first part of the said tracks 110, in order to facilitate the electrical connection to the electrical circuit of the electronic assembly 36 with which the electrical phase connector 10 is designed to cooperate. Advantageously, and as shown in FIG. 2, the second part 111 of the conductive tracks 110 can comprise an electrical connection terminal 115. The electrical connection terminal 115 is advantageously in the torn of a female connector, in order to facilitate the welding and/or the crimping and/or the screwing of a means for electrical connection of the corresponding power module of the electronic assembly with the electrical phase connector 10.

Advantageously, all the second parts 111 of the conductive phase tracks 110 of the electrical phase connector 10 and/or all the electrical connection terminals 115 of the said electrical phase connector 10 are situated at the same radial distance relative to the central axis O, along an exterior peripheral contour of the said electrical phase connector 10.

Each first part 112 of all the conductive tracks 110 advantageously takes the form of an angular segment which extends around the central axis O at the same radial distance relative to the said central axis O.

At a first end of the first part 112, each conductive track 110 comprises one of the two electrical coupling means 130b, and. at a second end it comprises the electrical connection terminal 115 and/or the second axial extension part 111.

For example, all the first electrical coupling means 130a and all the second electrical coupling means 130b and all the electrical connection terminals 115 of the second conductive tracks and/or all the corresponding second axial extension parts 111 are situated at the same radial distance from the central axis O. Alternatively, these elements could each be situated on a different circumference, and thus at different radial distances from the central axis O.

In the embodiments illustrated in the figures, the conductive phase tracks 110 are situated axially above the conductive neutral tracks 120. Alternatively, the conductive phase tracks 110 could be situated below the conductive neutral tracks 120. Again alternatively, only a part of one of the tracks 110, 120 can be situated below and/or above the other parts of the other tracks.

Again in the examples illustrated here, the conductive phase tracks 110 are all situated radially on the exterior of the second segments 122a of the conductive neutral tracks 120. Alternatively, the conductive phase tracks 110 are all situated radially in the interior of the second segments 122a of the conductive neutral tracks 120. Again alternatively, only part of one of the tracks 110, 120 can be situated radially in the interior and/or on the exterior of the other parts of the other tracks.

In the embodiment illustrated in FIG. 2, the conductive tracks form 110, 120 are over-moulded by an over-moulding material 140 which is preferably electrically insulating, such as plastic for example. Thus, the phase connector 10 in FIG. 2 and the one in FIG. 3 different from one another only by the presence of this over-moulding material 140.

Figure 4:
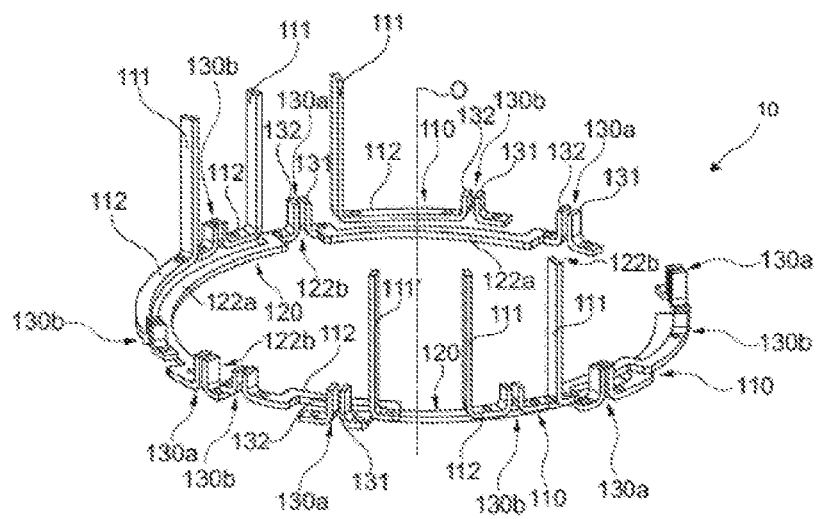
FIG. 4 illustrates a view in perspective of a second embodiment of an electrical phase connector according to the invention.
Figure 5:
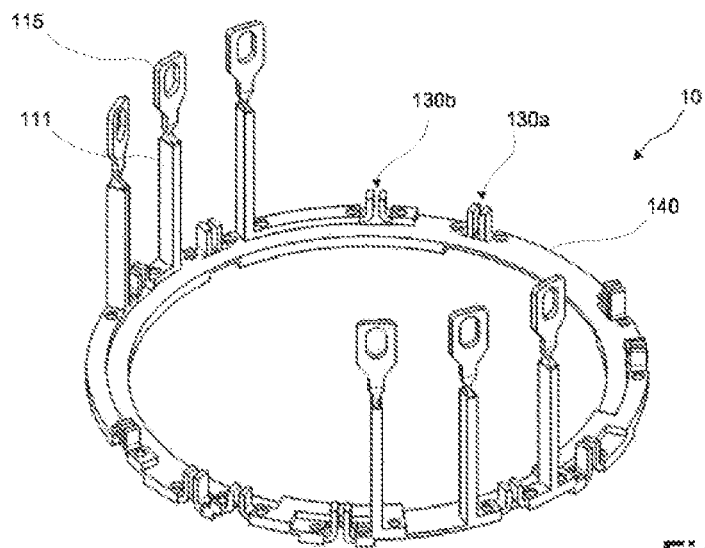
FIG. 5 illustrates a view in perspective of a variant embodiment of the second example of the phase connector in FIG. 4.

FIGS. 4 and 5 illustrate a second embodiment of an electrical phase connector 10. This connector differs from the one in the first example only by the angular configuration of the second axial extension parts 111 and/or the electrical connection terminals 115 of the conductive phase tracks 110. The other characteristics are identical to the first embodiment. In addition, the phase connector 10 in FIG. 4 and the one in FIG. 5 different from one another only by the presence of the over-moulding material 140.

This new angular configuration of the second axial extension parts 111 and/or the electrical connection terminals 115 makes it possible to adapt the stator 20 to the arrangement of the power modules of the electronic assembly 36, whilst having a standard stator winding wherein the angular arrangement of the phase inputs/outputs 235b is the same irrespective of the structure of the electronic assembly.

Figure 6:
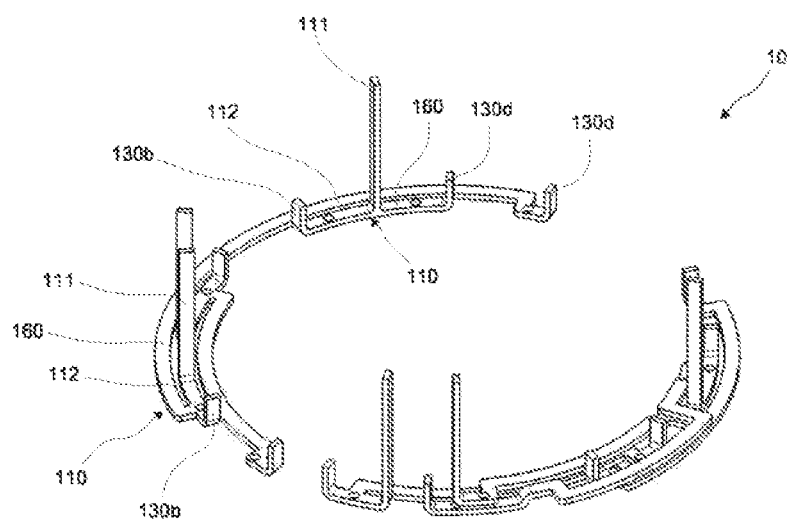
FIG. 6 illustrates a view in perspective of a third embodiment of an electrical phase connector according to the invention.
Figure 7:
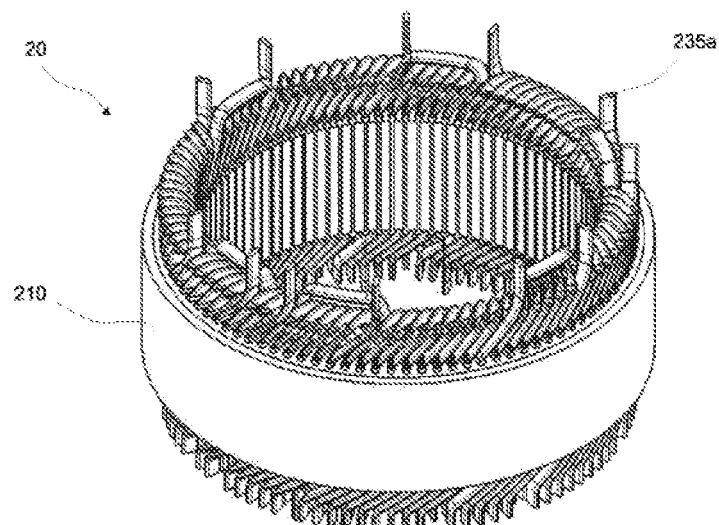
FIG. 7 illustrates a view in perspective of an example of a stator according to the invention.

According to a third embodiment illustrated in FIGS. 6 and 7, the stator has a coupling of the triangle type, i.e. the phase connector 10 aloes not comprise a conductive neutral track 110, and the winding 230 does not comprise a neutral point 235b, unlike the star coupling shown with reference to FIGS. 2 to 5.

In this third example, FIG. 6 illustrates an example of an electrical phase connector 10 comprising a plurality of conductive phase tracks 110. In this example, the conductive tracks are not over-moulded by an over-moulding material. Alternatively, the said tracks can be over-moulded by an over-moulding material 140 in the same manner as for the connectors 10 in the examples in FIGS. 2 and 5. FIG. 7 illustrates an example of a standard stator 20, on which the phase connector 10 in FIG. 6 can be fitted.

In this third example, at least one of the conductive phase tracks 110 comprises a coupling portion 160 extending from the body of the said track formed by the first part 112. Preferably, each conductive track 110 comprises a coupling portion 160. Each coupling portion 160 comprises at a free end a coupling means 130d with a phase input/output 135a of the winding. The said means 130d can be identical to the coupling means 130b. Thus, each conductive track 110 miles it possible both to connect a phase of the winding to the electronic assembly 36, and to connect two phases of the winding to one another in order to form the coupling in the form of a triangle. The coupling portion 160 can extend according to the same circumference as the first part 112, such as to form the same arc of a circle. Alternatively, the coupling portion 160 can extend radially in the interior and/or radially on the exterior relative to the first part 112. Again alternatively, only a single part of the coupling portion 160 can be situated radially in the interior and/or on the exterior of the first part 112. In a similar manner, the coupling portion 160 can extend on the same radial plane, or it can be situated at least partly on a different radial plane situated below or above the one comprising the first part 112. Each conductive phase track 110 can have a structure different from that of the other conductive phase tracks of the same connector 10, or, as a variant, it can have an identical structure.

Again in this example, the coupling means 130b of the conductive tracks 110 are formed only by a curved portion 131 which can be welded to the corresponding phase input/output 235a of the winding. Alternatively, the coupling means 130b can be formed by a vice comprising two curved portions 131, 132, as previously explained. Similarly, the coupling means 130a, 130b previously described can comprise a single curved portion welded on the corresponding part of the winding.

Figure 8:
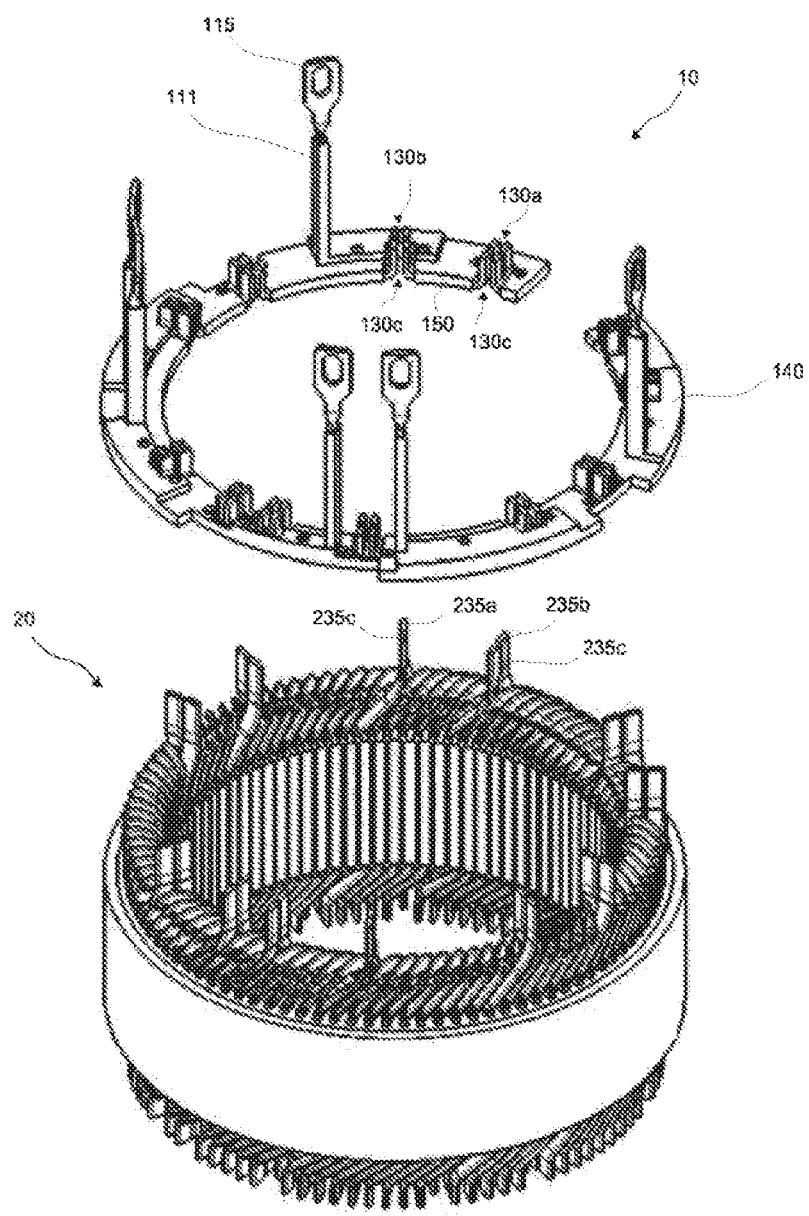
FIG. 8 illustrates a view in perspective of a fourth embodiment of a phase connector according to the invention and its example of an associated stator.

FIG. 8 illustrates a fourth embodiment of a connector 10 and of a stator 20 in which the stator comprises phase inputs/outputs 135a and neutral points 135b and the connector comprises conductive phase tracks 110 and conductive neutral tracks 120. In this example, the winding also comprises winding connection points 235c which are coupled electrically with one of the electrical conductors 220 of the winding, and extend projecting relative to the chignon, preferably the rear chignon, in the axial direction O. In the same manner as for the neutral points 235b, the connection points 235c are connected to conductive connection tracks 150 of the electrical phase connector 10 by means of coupling means 130c which can be identical to the coupling means 130a of the conductive neutral tracks 120 previously described. These connection points 235c can form a connection between two electric coils of a single phase of the winding 230, or a turning portion forming an angle of 180° electrical within a single coil.

In this example, the electrical phase connector 10 thus comprises a plurality of conductive connection tracks 150 which can be formed in the same manner as the conductive neutral tracks 120. These conductive tracks each comprise a body extending in particular in the form of an angular segment, and at least two coupling means 130c disposed respectively at the ends of the said body, such as to cooperate with respective coupling means 235c of the winding. These coupling means 130c can have the form of a vice, like the said coupling means 130a, 130b of the first or second embodiments, or the form of a single curved part, like the said coupling means 130b of the third embodiment.

Alternatively, this embodiment in FIG. 8 can also apply to a stator which has a coupling of the triangle type, i.e. without a neutral point 135b, and the connector 10 will then comprise conductive phase tracks 110 and conductive connection tracks 150.

In the third and fourth embodiments, the angular arrangement of the second parts 111 with axial extension 111 and/or of the electrical connection terminals 115 of the conductive phase tracks 110 can change in order to correspond to a particular arrangement of the electronic assembly without changing the winding 230 of the stator 20.

In comparison with the production of a complete rotary electrical machine, the invention thus makes it possible to create a rotary electrical machine, the base of which, formed by the stator, is identical for a plurality of models of the machine, and only the electrical interfacing device of which changes according to the arrangement of the electronic assembly.

It will be appreciated that the invention is not limited to the examples which have just been described, and numerous arrangements of these examples can be implemented without departing from the context of the invention. In particular, the different characteristics, forms, variants and embodiments of the invention can be associated with one another according to different combinations, provided that they are not incompatible or mutually exclusive. In particular, all the variants and embodiments previously described can be combined with one another.

The invention claimed is:

1. A rotary electrical machine for a vehicle, the rotary electrical machine comprising:
   an electronic assembly to control the said rotary electrical machine;
   a stator comprising a stator body with a plurality of notches formed between its two axial ends, and a winding fitted in the stator body via the said notches, the winding comprising a plurality of portions of conductor forming phase inputs/outputs; and
   an electrical phase connector configured to interface the winding electrically with the electronic assembly;
   the electrical phase connector comprising a plurality of conductive phase tracks which are insulated electrically against one another, each conductive phase track being connected firstly to an element of the electronic assembly and secondly to a phase input/output to transport an electrical phase from or to the stator,
   wherein each conductive phase track comprises:
      a conductive track body in the form of an angular segment;
      at a first end of the said angular segment, an electrical connection part extending in a substantially axial direction for the connection with the electronic assembly; and
      at a second end of the said angular segment, electrical coupling means which cooperate with complementary coupling means of the winding,
   wherein the angular segment, the electrical connection part, and the electrical coupling means are collectively formed by a single piece of electrically conductive material.

2. The rotary electrical machine according to claim 1, wherein the electrical coupling means comprise at least one curved lug extending facing the complementary coupling means of the winding, such as to form an electrical contact with the latter.

3. The rotary electrical machine according to claim 1, wherein each conductive phase track further comprises a coupling portion with a supplementary electrical coupling means cooperating with a complementary coupling means of the winding to connect a first phase of the winding electrically to a second phase.

4. The rotary electrical machine according to claim 1, wherein the conductive phase tracks are over-moulded at least partly by an over-moulding material.

5. The rotary electrical machine according to claim 1, wherein:
the winding additionally comprises a plurality of portions of conductor forming neutral points;
the electrical phase connector comprises at least one conductive neutral track, the conductive neutral track being insulated electrically against the conductive phase tracks, and connected to at least one neutral point.

6. The rotary electrical machine according to claim 5, wherein the at least one conductive neutral track comprises:
a conductive track body in the form of an angular segment, and, at the ends of the said angular segment, electrical coupling means cooperating with complementary coupling means of the winding.

7. The rotary electrical machine according to claim 6, wherein the conductive neutral track comprises a plurality of angular segments, each angular segment comprising, at one of its ends at least, a curved lug forming the vice with the curved lug of the angular segment directly adjacent in order to form the electrical coupling means.

8. The rotary electrical machine according to claim 1, wherein:
the winding further comprises a plurality of portions of conductor forming winding connection points;
the electrical phase connector comprises a plurality of conductive connection tracks, each conductive connection track being insulated electrically against the conductive phase tracks, and connected to at least two connection points to form a connection between two electrical coils of a single phase of the winding, or a connection between two parts of a single electrical coil of a single phase of the winding.

9. The rotary electrical machine according to claim 8, wherein each conductive connection track forms a serial connection between two connection points of the winding of a single phase.

10. The rotary electrical machine according to claim 9, wherein the conductive connection track comprises a conductive track body in the form of an angular segment and, at the ends of the said angular segment, electrical coupling means cooperating with complementary coupling means of the winding.

11. The rotary electrical machine according to claim 1, wherein the winding comprises a plurality of electrical conductors, the winding forming a plurality of electrical phases which are distinct from one another, each electrical phase being formed by a plurality of electrical conductors connected in series with one another.

* * * * *